US012649125B1

(12) United States Patent
Wang

(10) Patent No.: US 12,649,125 B1
(45) Date of Patent: Jun. 9, 2026

(54) DETACHABLE AND SEALED DEHUMIDIFICATION CABINET

(71) Applicant: Luoyang Selead Office Furniture Co., ltd., Luoyang (CN)

(72) Inventor: Tong Wang, Luohe (CN)

(73) Assignee: Luoyang Selead Office Furniture Co., ltd., Luoyang (CN)

( * ) Notice: Subject to any disclaimer, the term of this patent is extended or adjusted under 35 U.S.C. 154(b) by 0 days.

(21) Appl. No.: 19/302,487

(22) Filed: Aug. 18, 2025

(30) Foreign Application Priority Data

Aug. 7, 2025 (CN) ......................... 202521678358.X

(51) Int. Cl.
| | |
|---|---|
| *B01D 53/26* | (2006.01) |
| *A47B 47/00* | (2006.01) |
| *B29C 64/364* | (2017.01) |
| *B33Y 30/00* | (2015.01) |

(52) U.S. Cl.
CPC .............. *B01D 53/26* (2013.01); *A47B 47/00* (2013.01); *B29C 64/364* (2017.08); *B33Y 30/00* (2014.12); *A47B 2220/0077* (2013.01); *A47B 2220/0091* (2013.01); *B01D 2257/80* (2013.01); *B01D 2259/45* (2013.01)

(58) Field of Classification Search
CPC .... A47B 47/00; A47B 47/0066; B01D 53/26; B29C 64/364; B33Y 30/00
USPC ......................................... 312/1, 257.1, 209
See application file for complete search history.

(56) References Cited

U.S. PATENT DOCUMENTS

| | | | | |
|---|---|---|---|---|
| 3,305,287 A * | 2/1967 | Rait ....................... | A61H 33/06 |
| | | | 220/592.25 |
| 5,147,121 A * | 9/1992 | McIlwraith .............. | H02B 1/28 |
| | | | 312/265.4 |
| 5,232,277 A * | 8/1993 | Cassady ................... | H02B 1/38 |
| | | | 16/221 |
| 6,834,920 B2 * | 12/2004 | Landsberger ............. | B01L 1/02 |
| | | | 312/257.1 |
| 7,318,630 B2 * | 1/2008 | Landsberger ...... | A47B 47/0091 |
| | | | 312/111 |
| 8,534,774 B1 * | 9/2013 | Chang ................... | A47B 96/206 |
| | | | 312/111 |
| 8,857,828 B1 * | 10/2014 | San Clemente .......... | B62B 3/10 |
| | | | 280/47.35 |
| 8,917,512 B2 * | 12/2014 | Lozon .................. | H05K 7/1498 |
| | | | 361/826 |
| 2005/0110371 A1 * | 5/2005 | Li ....................... | A47B 87/0215 |
| | | | 312/108 |
| 2011/0278997 A1 * | 11/2011 | Wilkins ................... | B25J 21/02 |
| | | | 312/1 |

* cited by examiner

*Primary Examiner* — James O Hansen
(74) *Attorney, Agent, or Firm* — Law Offices of Sandy Lipkin; Sandy Lipkin

(57) ABSTRACT

A detachable and sealed dehumidification cabinet includes a cabinet body and a sealing structure. The cabinet body is provided with a first main body. The first main body is provided with a first storage space. A plurality of first side walls are connected to surround and form the first storage space. The sealing structure is arranged at joints between the plurality of first side walls, and the sealing structure is configured for sealing the joints between the plurality of first side walls to form the sealed first storage space.

8 Claims, 9 Drawing Sheets

DETACHABLE AND SEALED DEHUMIDIFICATION CABINET

CROSS-REFERENCE TO RELATED APPLICATIONS

The application claims priority of Chinese patent application CN202521678358X, filed on Aug. 7, 2025, which is incorporated herein by reference in its entireties.

TECHNICAL FIELD

The present invention relates to the technical field of dehumidification cabinets, particularly to a detachable and sealed dehumidification cabinet.

BACKGROUND ART 3D printing is a type of rapid prototyping technology, also known as additive manufacturing. It is a technology that constructs objects by layer-by-layer printing based on digital model files, using bondable materials such as powdered metal or plastic. 3D printing is usually realized by means of digital technology material printers. It is often used in fields such as mold manufacturing and industrial design to produce models, and later gradually applied to the direct manufacturing of some products. There are already parts printed using this technology.

Many 3D printing materials are very sensitive to humidity. When the materials absorb excessive moisture, the printing quality will be reduced, such as problems like bubbles or poor fusion. Therefore, controlling the humidity of the printing environment is another key factor to ensure printing quality. Most dehumidifying storage products on the market adopt welding technology to ensure the airtightness inside the cabinet, but this technology leads to excessively high transportation costs, which is unfavorable for transportation.

SUMMARY

In order to overcome the shortcomings of the prior art, the present invention provides a detachable and sealed dehumidification cabinet. The detachable and sealed dehumidification cabinet includes:

a cabinet body, wherein the cabinet body is provided with a first main body, the first main body is provided with a first storage space, and a plurality of first side walls are connected to surround and form the first storage space; and a sealing structure, wherein the sealing structure is arranged at joints between the plurality of first side walls, and the sealing structure is configured for sealing the joints between the plurality of first side walls to form the sealed first storage space.

As an improvement of the present invention, the plurality of first side walls are detachably connected to each other. The plurality of first side walls include a first upper side wall, a first lower side wall, and a first connecting side wall. The first connecting side wall is connected to the first upper side wall and the first lower side wall. The first upper side wall is detachably connected to an upper side of the first connecting side wall, and the first lower side wall is detachably connected to a lower side of the first connecting side wall. The first upper side wall, the first lower side wall, and the first connecting side wall surround to form the first storage space.

As an improvement of the present invention, the sealing structure includes a first sealing part and a second sealing part. The first sealing part is configured for sealing a joint between the first upper side wall and the first connecting side wall, and the second sealing part is configured for sealing a joint between the first lower side wall and the first connecting side wall.

As an improvement of the present invention, the first upper side wall is detachably connected to a top portion of the first connecting side wall, and the first lower side wall is detachably connected to a bottom portion of the first connecting side wall. The first connecting side wall includes a first left side wall, a first right side wall, a first front side wall, and a first rear side wall. The first sealing part includes a first sealing strip, a second sealing strip, and a third sealing strip. The first sealing strip is disposed between the first upper side wall and the first left side wall. The first sealing strip is configured for sealing a joint between the first upper side wall and the first left side wall. The second sealing strip is disposed between the first upper side wall and the first right side wall. The second sealing strip is configured for sealing a joint between the first upper side wall and the first right side wall. The third sealing strip is disposed between the first upper side wall and the first rear side wall. The third sealing strip is configured for sealing a joint between the first upper side wall and the first rear side wall.

As an improvement of the present invention, the second sealing part includes a fourth sealing strip, a fifth sealing strip, and a sixth sealing strip. The fourth sealing strip is disposed between the first lower side wall and the first left side wall. The fourth sealing strip is configured for sealing a joint between the first lower side wall and the first left side wall. The fifth sealing strip is disposed between the first lower side wall and the first right side wall. The fifth sealing strip is configured for sealing a joint between the first lower side wall and the first right side wall. The sixth sealing strip is disposed between the first lower side wall and the first rear side wall. The sixth sealing strip is configured for sealing a joint between the first lower side wall and the first rear side wall.

As an improvement of the present invention, the sealing structure further includes a third sealing part. The third sealing part is configured for sealing joints between the first rear side wall and both the first left side wall and the first right side wall. The third sealing part includes a seventh sealing strip and an eighth sealing strip. The seventh sealing strip is disposed between the first rear side wall and the first left side wall. The seventh sealing strip is configured for sealing a joint between the first rear side wall and the first left side wall. The eighth sealing strip is disposed between the first rear side wall and the first right side wall. The eighth sealing strip is configured for sealing a joint between the first rear side wall and the first right side wall.

As an improvement of the present invention, the cabinet body further includes a fixing member. The fixing member is disposed on the first lower side wall, and is detachably connected to the first left side wall and the first right side wall respectively. The sealing structure includes a fourth sealing part. The fourth sealing part is configured for sealing a joint between the fixing member and the first left side wall, and a joint between the fixing member and the first right side wall. The fourth sealing part includes a ninth sealing strip and a tenth sealing strip. The ninth sealing strip is disposed between the fixing member and the first left side wall. The ninth sealing strip is configured for sealing the joint between the fixing member and the first left side wall. The tenth sealing strip is disposed between the fixing member and the first right side wall. The tenth sealing strip is configured for sealing the joint between the fixing member and the first right side wall.

As an improvement of the present invention, the sealing structure includes a fifth sealing part. The fifth sealing part is magnetically attracted to the first front side wall. The fifth sealing part is detachably connected to the first left side wall, the first right side wall, the first upper side wall, and the fixing member respectively. The fifth sealing part includes an eleventh sealing strip, a twelfth sealing strip, a thirteenth sealing strip, and a fourteenth sealing strip. The eleventh sealing strip is disposed on the first left side wall and is detachably connected to the first left side wall. The twelfth sealing strip is disposed on the first right side wall and is detachably connected to the first right side wall. The thirteenth sealing strip is disposed on the first upper side wall and is detachably connected to the first upper side wall. The fourteenth sealing strip is disposed on the fixing member and is detachably connected to the fixing member.

As an improvement of the present invention, the sealing structure may be made of materials such as EVA (ethylene-vinyl acetate copolymer), silicone, and rubber.

As an improvement of the present invention, a storage member is further provided inside the cabinet body. The storage member is disposed in the first storage space. The storage member is detachably connected to the first left side wall and the first right side wall respectively. The storage member is configured for receiving items. The storage member includes a plurality of support rods. The plurality of support rods are arranged in sequence. An inner wall of the first left side wall is provided with a first fixing frame. An inner wall of the first right side wall is provided with a second fixing frame. One side of each of the plurality of support rods is detachably connected to the first fixing frame, and an opposite side of each of the plurality of support rods is detachably connected to the second fixing frame. The storage member is a storage plate. The storage plate is disposed on the first fixing frame and the second fixing frame, and the storage plate is detachably connected to the first fixing frame and the second fixing frame respectively.

As an improvement of the present invention, one side of the first front side wall is detachably connected to the first right side wall through a plurality of hinge members. The plurality of hinge members are arranged in sequence. One side of each of the plurality of hinge members is detachably connected to the first front side wall, and an opposite side of each of the plurality of hinge members is detachably connected to the first right side wall. A display structure is provided on the first front side wall. One side of the display structure is disposed on an inner wall of the first front side wall, and an opposite side of the display structure passes through the first front side wall and is disposed outside the first front side wall. The display structure includes a display screen and a control board. A plurality of buttons are provided on one side of the first front side wall where the display screen is positioned. Both the display screen and the plurality of buttons are electrically connected to the control board. A first handle is arranged on an outer wall of the first front side wall.

As an improvement of the present invention, the cabinet body further includes a dehumidifier. The dehumidifier is configured for dehumidifying the first storage space, keeping humidity in the first storage space within a controllable range. One side of the dehumidifier is disposed in the first storage space and electrically connected to the control board. An opposite side of the dehumidifier passes through the first storage space, is disposed outside the first storage space, and is connected to an external power supply.

As an improvement of the present invention, the cabinet body further includes a first storage structure. The first storage structure is connected to the first main body. The first storage structure is provided with a second storage space. A plurality of second side walls are connected to surround and form the second storage space. The plurality of second side walls are detachably connected to each other. The plurality of second side walls include a second upper side wall and a second connecting side wall connected to the second upper side wall. The second upper side wall is detachably connected to an upper side of the second connecting side wall. The second connecting side wall includes a second left side wall, a second right side wall, and a second rear side wall. The second upper side wall, the second left side wall, the second right side wall, the second rear side wall, and the first upper side wall surround to form the second storage space.

As an improvement of the present invention, the first storage structure further includes a drawer. The drawer is disposed in the second storage space. A plurality of third side walls are connected to surround and form the drawer. The plurality of third side walls are foldable. The plurality of third side walls are third non-woven fabric side walls. The drawer is equipped with a second handle. The second handle is configured for putting the drawer into the second storage space or pulling the drawer out of the second storage space.

As an improvement of the present invention, the cabinet body further includes a second storage structure. The second storage structure is disposed above the cabinet body. The second storage structure is provided with a third storage space. A plurality of fourth side walls are connected to surround and form the third storage space. The plurality of fourth side walls are detachably connected to each other. The plurality of fourth side walls include a third upper side wall, a second lower side wall, and a third connecting side wall. The third connecting side wall is connected to the third upper side wall and the second lower side wall. The third upper side wall is detachably connected to an upper side of the third connecting side wall. The second lower side wall is detachably connected to a lower side of the third connecting side wall. The third upper side wall, the second lower side wall, and the third connecting side wall surround to form the third storage space.

As an improvement of the present invention, the third connecting side wall includes a third left side wall, a third right side wall, and a third rear side wall. The third upper side wall is detachably connected to the third left side wall. The third upper side wall is detachably connected to the third right side wall. The third upper side wall is detachably connected to the third rear side wall. The second lower side wall is detachably connected to the third left side wall. The second lower side wall is detachably connected to the third right side wall. The second lower side wall is detachably connected to the third rear side wall. The third left side wall is provided with a first light-transmitting plate and a second light-transmitting plate in sequence. The third right side wall is provided with a third light-transmitting plate and a fourth light-transmitting plate in sequence. The first light-transmitting plate corresponds to the third light-transmitting plate in position. The second light-transmitting plate corresponds to the fourth light-transmitting plate in position.

As an improvement of the present invention, the second storage structure further includes a first insertion member and a second insertion member. The first insertion member and the second insertion member are both disposed above the cabinet body and correspond to each other in position.

The first insertion member includes a first connecting rod. Two ends of the first connecting rod are respectively provided with a first insertion portion and a second insertion portion. The second insertion member includes a second connecting rod. Two ends of the second connecting rod are respectively provided with a third insertion portion and a fourth insertion portion. A bottom portion of the third left side wall is inserted into the first insertion portion and the third insertion portion respectively. A bottom portion of the third right side wall is inserted into the second insertion portion and the fourth insertion portion respectively.

As an improvement of the present invention, the third connecting side wall further includes a second front side wall and a third front side wall. The second front side wall and the third front side wall are symmetrically positioned. The second front side wall is hinged to the third upper side wall. The second front side wall is hinged to the first connecting rod. The third front side wall is hinged to the third upper side wall. The third front side wall is hinged to the first connecting rod. The second storage structure further includes a partition plate. The partition plate is disposed within the third storage space and divides the third storage space into a fourth storage space and a fifth storage space. The partition plate is detachably connected to the third left side wall. The partition plate is detachably connected to the third right side wall. The partition plate is detachably connected to the third rear side wall. The partition plate is provided with a magnetic attraction structure. The magnetic attraction structure includes a first magnetic attraction member and a second magnetic attraction member. The first magnetic attraction member and the second magnetic attraction member are arranged opposite to each other. The second front side wall is provided with a third magnetic attraction member at a position corresponding to the first magnetic attraction member. The third magnetic attraction member is attracted to the first magnetic attraction member. The third front side wall is provided with a fourth magnetic attraction member at a position corresponding to the second magnetic attraction member. The fourth magnetic attraction member is attracted to the second magnetic attraction member. The third magnetic attraction member and the fourth magnetic attraction member are arranged opposite to each other.

As an improvement of the present invention, the cabinet body further includes a second storage structure and a lighting device. The lighting device is magnetically arranged within the second storage structure.

As an improvement of the present invention, the second storage structure further includes an air extraction device and a power connector. One side of the air extraction device is disposed in the third storage space, and an opposite side of the air extraction device passes through the third storage space and is disposed outside the second storage structure. One side of the power connector is disposed in the third storage space, and an opposite side of the power connector is connected to an external power supply through a connection cable.

Beneficial effects of the present invention are as follows. The present invention provides the detachable and sealed dehumidification cabinet. The detachable and sealed dehumidification cabinet includes the cabinet body and the sealing structure. The cabinet body is provided with the first main body. The first main body is provided with the first storage space. The plurality of first side walls are connected to surround and form the first storage space. The sealing structure is arranged at the joints between the plurality of first side walls. The sealing structure is configured for sealing the joints between the plurality of first side walls to form the sealed first storage space. Through the above structure, during installation, the sealing structure seals the joints of the cabinet body. Moreover, on the premise of ensuring the sealing performance inside the cabinet body, the product can be disassembled and assembled, which compresses the product volume, resulting in a small packaging size, convenient transportation, and thus significantly reducing the transportation cost.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
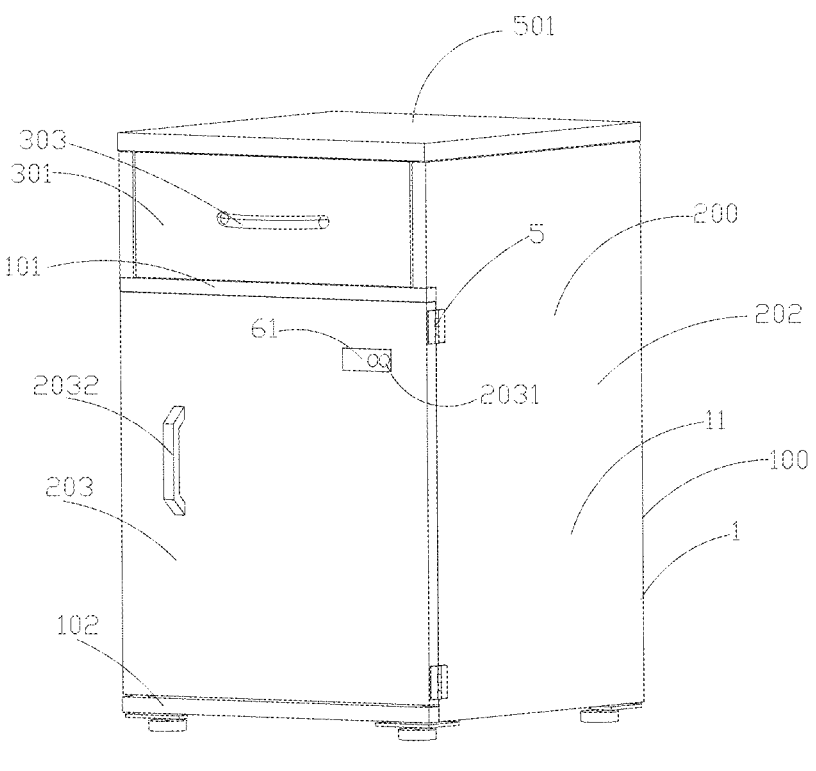
FIG. 1 is a schematic structural diagram of a cabinet body and a first storage structure according to the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
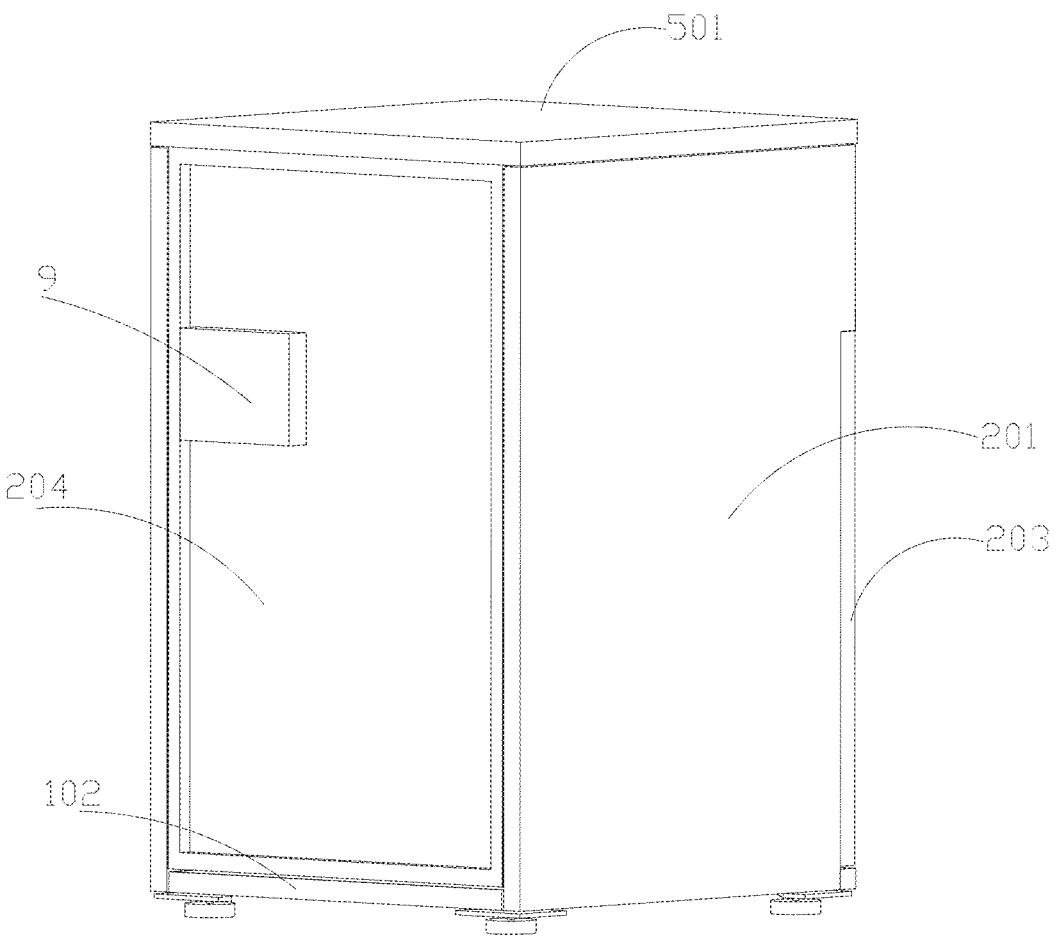
FIG. 2 is a schematic structural diagram of the cabinet body and the first storage structure from another angle according to the present invention.
Figure 3:
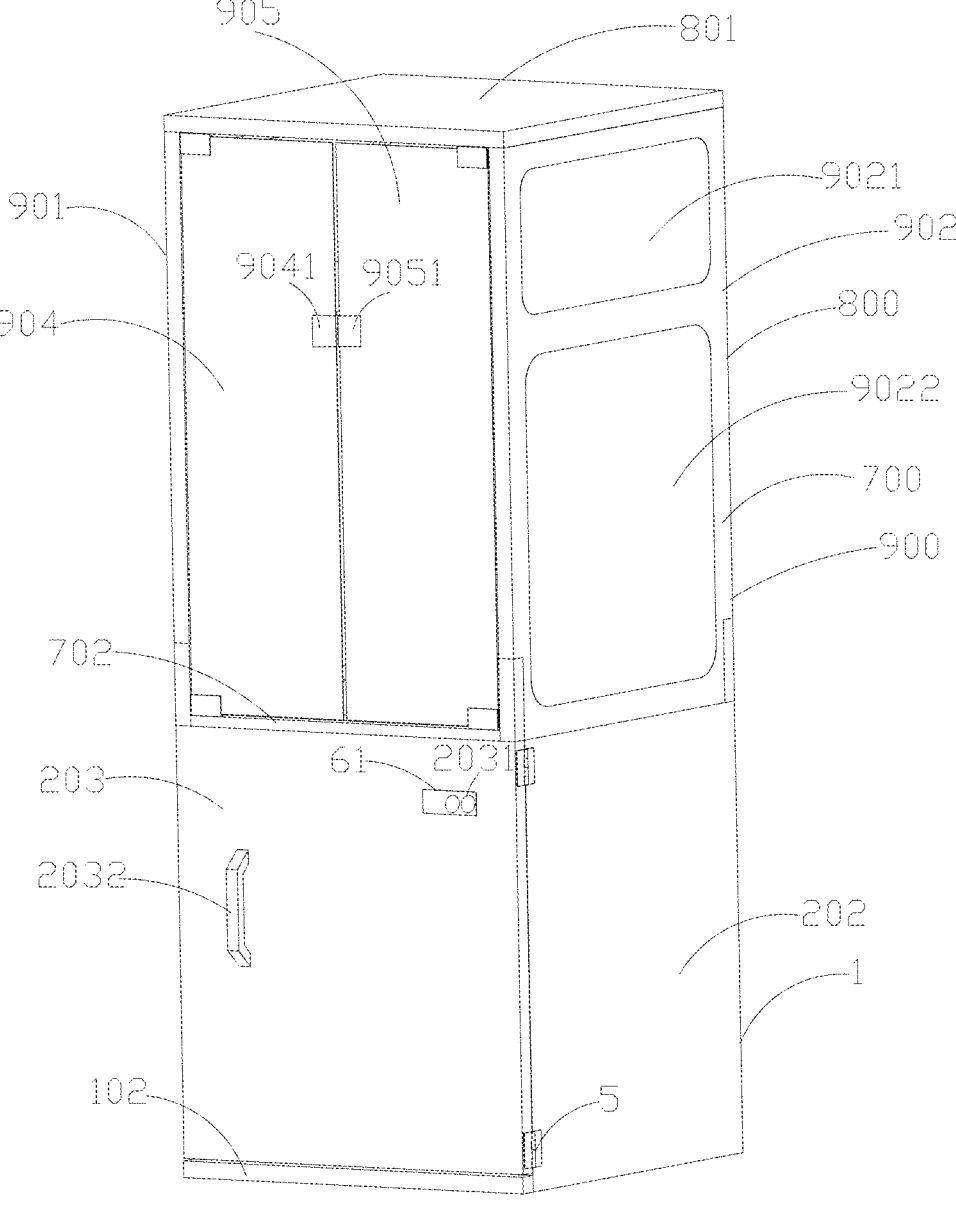
FIG. 3 is a schematic structural diagram of the cabinet body and a second storage structure according to the present invention.
Figure 4:
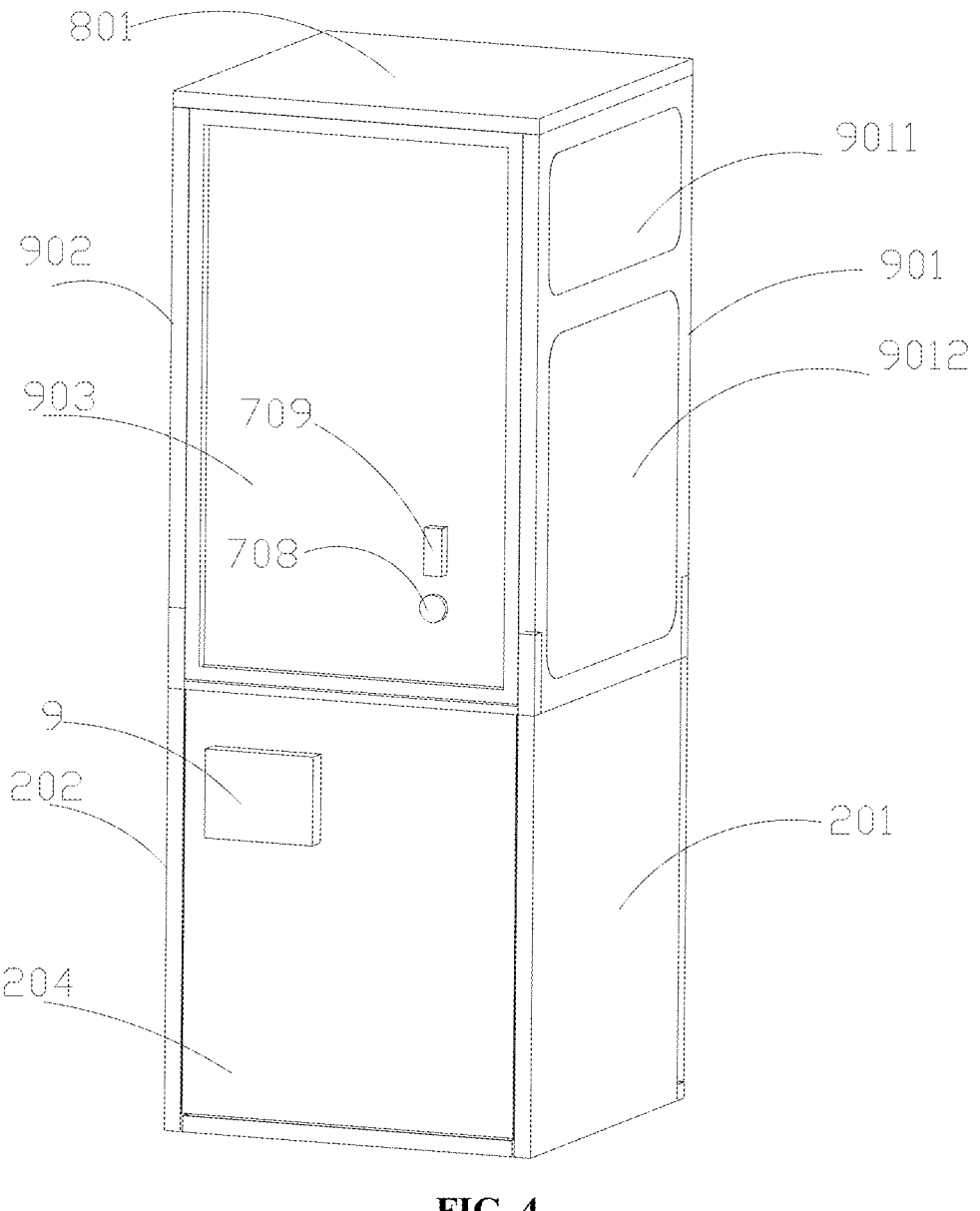
FIG. 4 is a schematic structural diagram of the cabinet body and the second storage structure from another angle according to the present invention.
Figure 5:
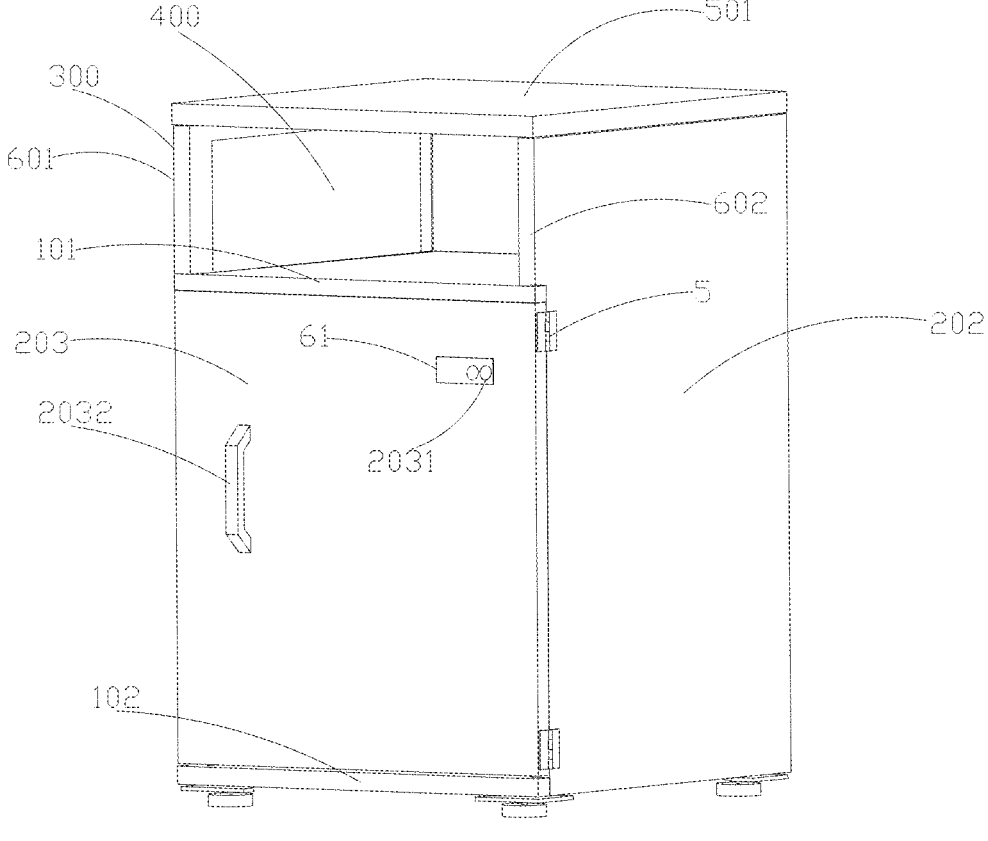
FIG. 5 is a schematic structural diagram of the cabinet body with a drawer removed and the first storage structure according to the present invention.
Figure 6:
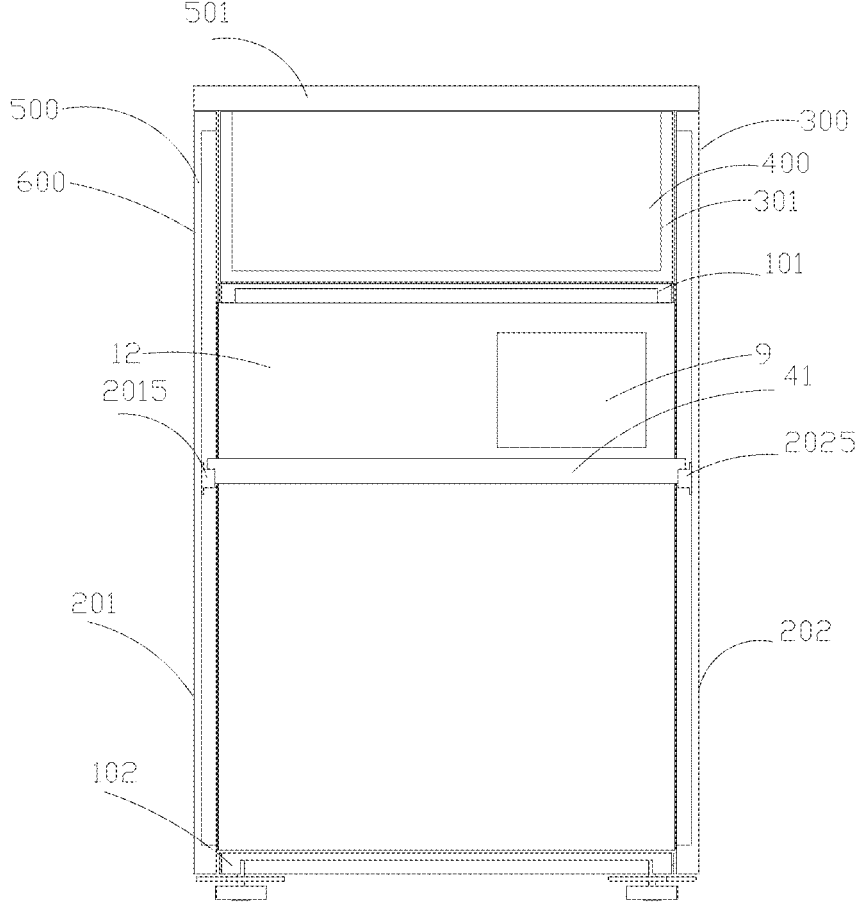
FIG. 6 is a cross-sectional view of the cabinet body and the first storage structure according to the present invention.
Figure 7:
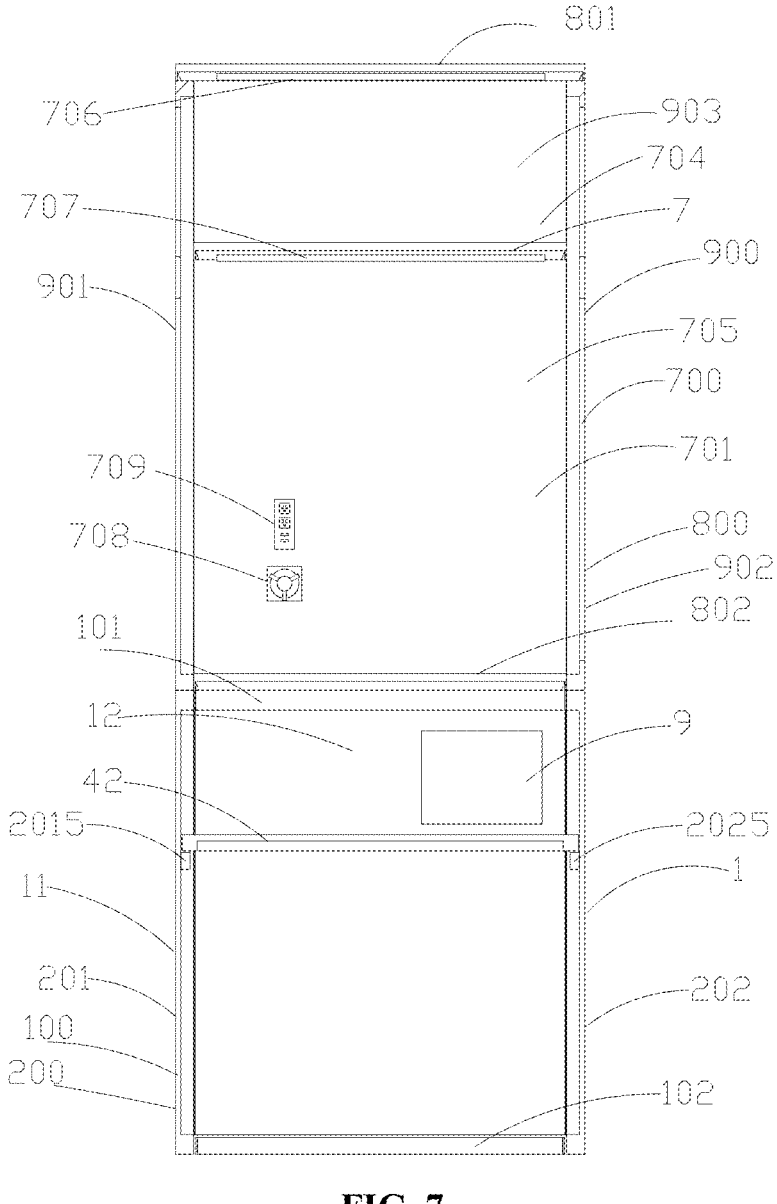
FIG. 7 is a cross-sectional view of the cabinet body and the second storage structure according to the present invention.
Figure 8:
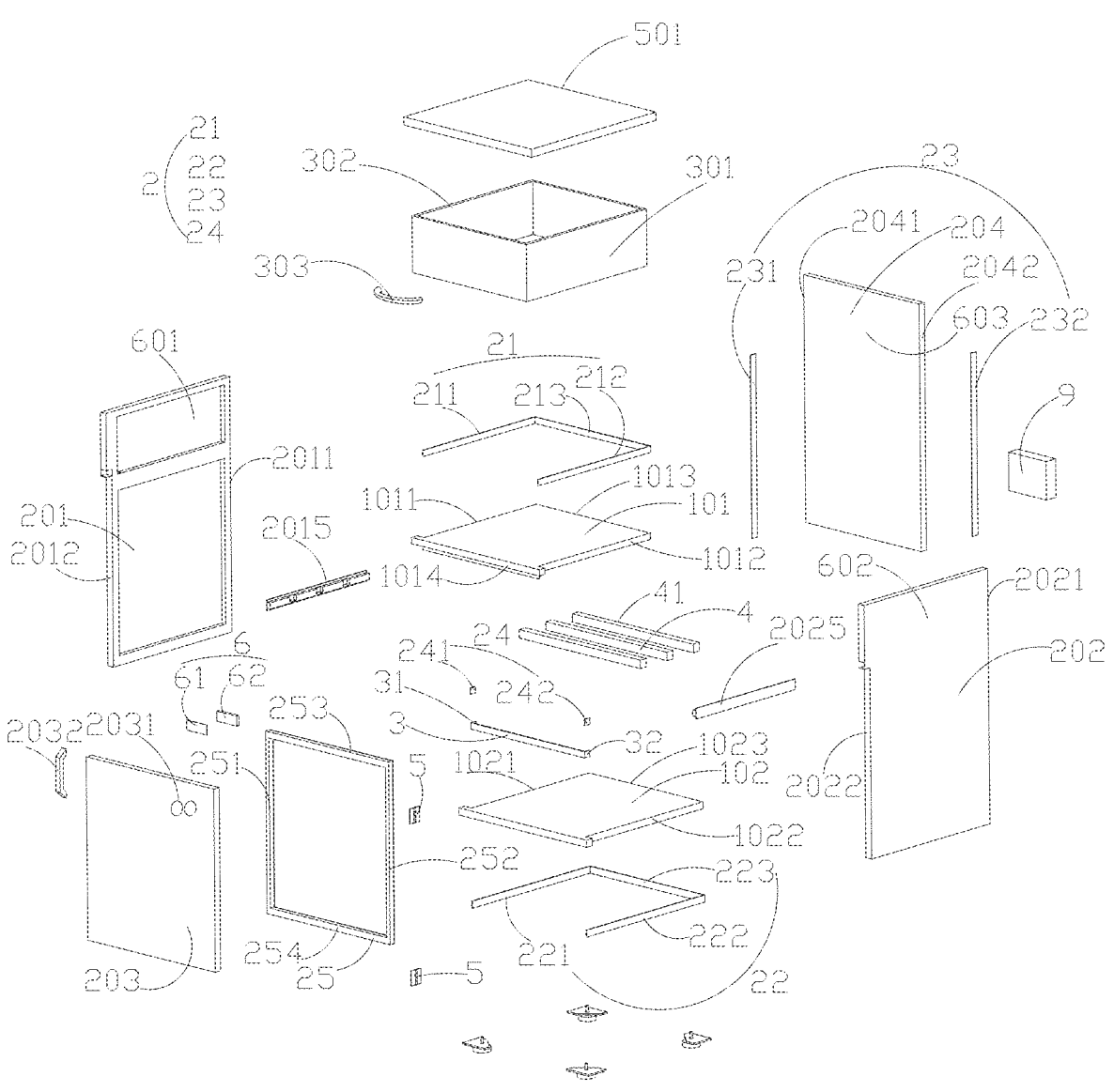
FIG. 8 is an exploded view of the cabinet body and the first storage structure according to the present invention.
Figure 9:
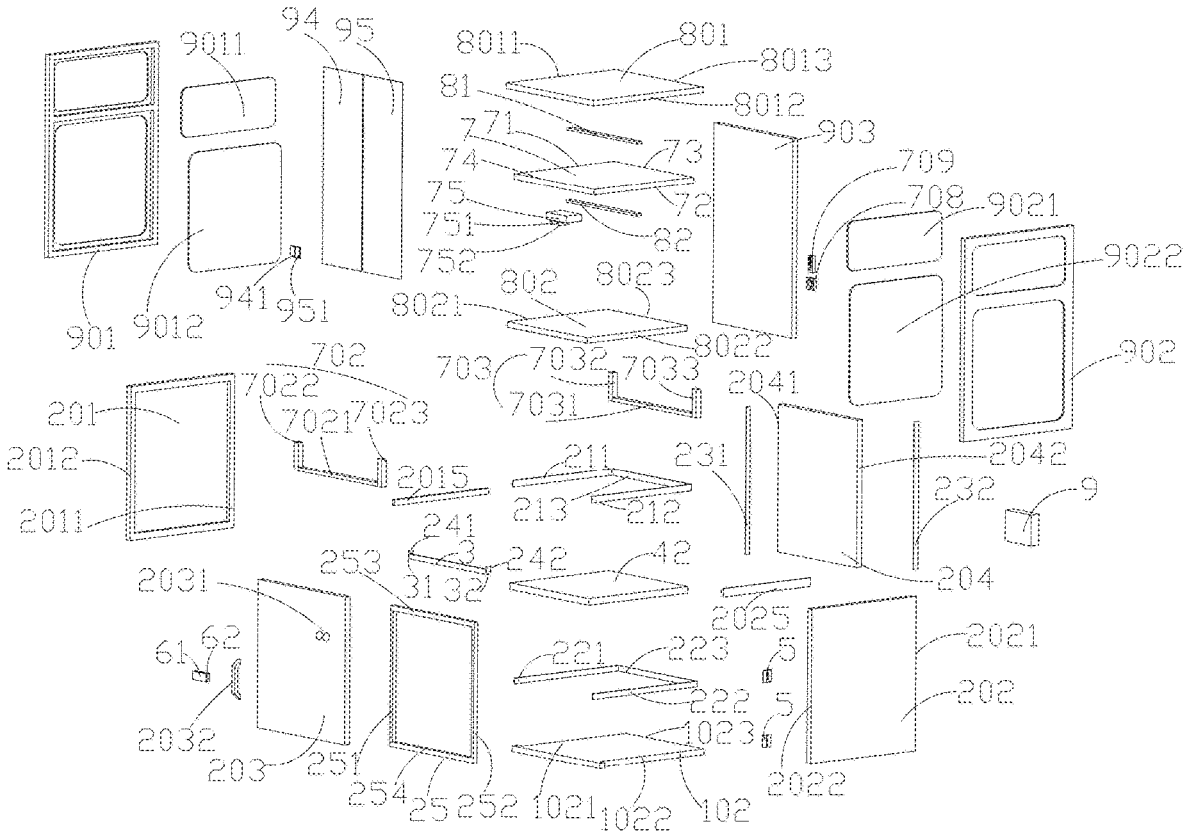
FIG. 9 is an exploded view of the cabinet body and second storage structure according to the present invention.

Referring to FIGS. 1-9, a detachable and sealed dehumidification cabinet includes: a cabinet body 1, wherein the cabinet body 1 is provided with a first main body 11, the first main body 11 is provided with a first storage space 12, and a plurality of first side walls 100 are connected to surround and form the first storage space 12; and a sealing structure 2, wherein the sealing structure 2 is arranged at joints between the plurality of first side walls 100, and the sealing structure 2 is used for sealing the joints between the plurality of first side walls 100 to form the sealed first storage space 12.

Through the above structure, during installation, the sealing structure 2 seals the joints of the cabinet body 1. Moreover, on the premise of ensuring the sealing performance inside the cabinet body 1, the product can be disassembled and assembled, which compresses the product volume, resulting in a small packaging size, convenient transportation, and thus significantly reducing the transportation cost.

In this embodiment, the plurality of first side walls 100 are detachably connected to each other. The plurality of first side walls 100 include a first upper side wall 101, a first lower side wall 102, and a first connecting side wall 200. The first connecting side wall 200 is connected to the first upper side wall 101 and the first lower side wall 102. The first upper side wall 101 is detachably connected to an upper side of the first connecting side wall 200, and the first lower side wall 102 is detachably connected to a lower side of the first connecting side wall 200. The first upper side wall 101, first lower side wall 102, and the first connecting side wall 200 surround to form the first storage space 12. The plurality of first side walls 100 are detachably connected to each other and surround to form the first storage space 12. The plurality of first side walls 100 are connected by screws, and the first side walls 100 fit closely with the sealing structure 2 to seal the cabinet body 1.

In this embodiment, the sealing structure 2 includes a first sealing part 21 and a second sealing part 22. The first sealing part 21 is used for sealing a joint between the first upper side wall 101 and the first connecting side wall 200, and the second sealing part 22 is used for sealing a joint between the first lower side wall 102 and the first connecting side wall 200. The first sealing part 21 seals the joint between the first upper side wall 101 and the first connecting side wall 200, and the second sealing part 22 seals the joint between the first lower side wall 102 and the first connecting side wall 200, thereby forming a sealed space within the cabinet body 1.

In this embodiment, the first upper side wall 101 is detachably connected to a top portion of the first connecting side wall 200, and the first lower side wall 102 is detachably connected to a bottom portion of the first connecting side wall 200. The first connecting side wall 200 includes a first left side wall 201, a first right side wall 202, a first front side wall 203, and a first rear side wall 204. The first sealing part 21 includes a first sealing strip 211, a second sealing strip 212, and a third sealing strip 213. The first sealing strip 211 is disposed at a detachable joint between a first side edge 1011 of the first upper side wall 101 and an upper side of the first left side wall 201, and seals the joint. One side of the first sealing strip 211 abuts against the first side edge 1011 of the first upper side wall 101, and an opposite side of the first sealing strip 211 abuts against the upper side of the first left side wall 201. The second sealing strip 212 is disposed at a detachable joint between a second side edge 1012 of the first upper side wall 101 and an upper side of the first right side wall 202, and seals the joint. One side of the second sealing strip 212 abuts against the second side edge 1012 of the first upper side wall 101, and an opposite side of the second sealing strip 212 abuts against the upper side of the first right side wall 202. The third sealing strip 213 is disposed at a detachable joint between a third side edge 1013 of the first upper side wall 101 and an upper side of the first rear side wall 204, and seals the joint. One side of the third sealing strip 213 abuts against the third side edge 1013 of the first upper side wall 101, and an opposite side of the third sealing strip 213 abuts against the upper side of the first rear side wall 204. The first sealing strip 211 seals the joint between the first side edge 1011 of the first upper side wall 101 and the upper side of the first left side wall 201. The second sealing strip 212 seals the joint between the second side edge 1012 of the first upper side wall 101 and the upper side of the first right side wall 202. The third sealing strip 213 seals the joint between the third side edge 1013 of the first upper side wall 101 and the upper side of the first rear side wall 204. The first sealing part 21 ensures a sealed state between the first upper side wall 101 and the upper side of the first left side wall 201, the upper side of the first right side wall 202, and the upper side of the first rear side wall 204.

In this embodiment, the second sealing part 22 includes a fourth sealing strip 221, a fifth sealing strip 222, and a sixth sealing strip 223. The fourth sealing strip 221 is disposed at a detachable joint between a first side edge 1021 of the first lower side wall 102 and a lower side of the first left side wall 201, and seals the joint. One side of the fourth sealing strip 221 abuts against the first side edge 1021 of the first lower side wall 102, and an opposite side of the fourth sealing strip 221 abuts against the lower side of the first left side wall 201. The fifth sealing strip 222 is disposed at a detachable joint between a second side edge 1022 of the first lower side wall 102 and a lower side of the first right side wall 202, and seals the joint. One side of the fifth sealing strip 222 abuts against the second side edge 1022 of the first lower side wall 102, and an opposite side of the fifth sealing strip 222 abuts against the lower side of the first right side wall 202. The sixth sealing strip 223 is disposed at a detachable joint between a third side edge 1023 of the first lower side wall 102 and a lower side of the first rear side wall 204, and seals the joint. One side of the sixth sealing strip 223 abuts against the third side edge 1023 of the first lower side wall 102, and an opposite side of the sixth sealing strip 223 abuts against the lower side of the first rear side wall 204. The fourth sealing strip 221 seals the joint between the first side edge 1021 of the first lower side wall 102 and the lower side of the first left side wall 201. The fifth sealing strip 222 seals the joint between the second side edge 1022 of the first lower side wall 102 and the lower side of the first right side wall 202. The sixth sealing strip 223 seals the joint between the third side edge 1023 of the first lower side wall 102 and the lower side of the first rear side wall 204. The second sealing part 22 ensures a sealed state between the first lower side wall 102 and the lower side of the first left side wall 201, the lower side of the first right side wall 202, and the lower side of the first rear side wall 204.

In this embodiment, the sealing structure 2 further includes a third sealing part 23. The third sealing part 23 is used for sealing joints between the first rear side wall 204 and both the first left side wall 201 and the first right side wall 202. The third sealing part 23 includes a seventh sealing strip 231 and an eighth sealing strip 232. The seventh sealing strip 231 is disposed at a detachable joint between a first side edge 2041 of the first rear side wall 204 and a first side edge 2011 of the first left side wall 201, and seals the joint. One side of the seventh sealing strip 231 abuts against the first side edge 2041 of the first rear side wall 204, and an opposite side of the seventh sealing strip 231 abuts against the first side edge 2011 of the first left side wall 201. The eighth sealing strip 232 is disposed at a detachable joint between a second side edge 2042 of the first rear side wall 204 and a first side edge 2021 of the first right side wall 202, and seals the joint. One side of the eighth sealing strip 232 abuts against the second side edge 2042 of the first rear side wall 204, and an opposite side of the eighth sealing strip 232 abuts against the first side edge 2021 of the first right side wall 202. The seventh sealing strip 231 seals the joint between the first side edge 2011 of the first left side wall 201 and the first side edge 2041 of the first rear side wall 204. The eighth sealing strip 232 seals the joint between the first side edge 2021 of the first right side wall 202 and the second side edge 2042 of the first rear side wall 204. The third sealing part 23 ensures a sealed state between the first left side wall 201, the first right side wall 202, and the first rear side wall 204.

In this embodiment, the cabinet body 1 further includes a fixing member 3. The fixing member 3 is disposed on the first lower side wall 102, and is detachably connected to the first left side wall 201 and the first right side wall 202 respectively. The sealing structure 2 includes a fourth sealing part 24. The fourth sealing part 24 is used for sealing a joint between the fixing member 3 and the first left side wall 201, and a joint between the fixing member 3 and the first right side wall 202. The fourth sealing part 24 includes a ninth sealing strip 241 and a tenth sealing strip 242. The ninth sealing strip 241 is disposed at a detachable joint between a first side edge 31 of the fixing member 3 and the lower side of the first left side wall 201, and seals the joint. One side of the ninth sealing strip 241 abuts against the first side edge 31 of the fixing member 3, and an opposite side of the ninth sealing strip 241 abuts against the lower side of the first left side wall 201. The tenth sealing strip 242 is disposed at a detachable joint between a second side edge 32 of the fixing member 3 and the lower side of the first right side wall 202, and seals the joint. One side of the tenth sealing strip 242 abuts against the second side edge 32 of the fixing member 3, and an opposite side of the tenth sealing strip 242 abuts against the lower side of the first right side wall 202. The ninth sealing strip 241 seals the joint between the first side edge 31 of the fixing member 3 and the lower side of the first left side wall 201. The tenth sealing strip 242 seals the joint between the second side edge 32 of the fixing member 3 and the lower side of the first right side wall 202. The fourth sealing part 24 ensures a sealed state between the first left side wall 201, the first right side wall 202, and the fixing member 3.

In this embodiment, the sealing structure 2 includes a fifth sealing part 25. The fifth sealing part 25 is magnetically attracted to the first front side wall 203. The fifth sealing part 25 is detachably connected to the first left side wall 201, the first right side wall 202, the first upper side wall 101, and the fixing member 3 respectively. The fifth sealing part 25 includes an eleventh sealing strip 251, a twelfth sealing strip 252, a thirteenth sealing strip 253, and a fourteenth sealing strip 254. The eleventh sealing strip 251 is disposed on a second side edge 2012 of the first left side wall 201 and is detachably connected to the second side edge 2012 of the first left side wall 201. The twelfth sealing strip 252 is disposed on a second side edge 2022 of the first right side wall 202 and is detachably connected to the second side edge 2022 of the first right side wall 202. The thirteenth sealing strip 253 is disposed on a fourth side edge 1014 of the first upper side wall 101 and is detachably connected to the fourth side edge 1014 of the first upper side wall 101. The fourteenth sealing strip 254 is disposed on the fixing member 3 and is detachably connected to the fixing member 3. The eleventh sealing strip 251, the twelfth sealing strip 252, the thirteenth sealing strip 253, and the fourteenth sealing strip 254 are distributed on the second side edge 2012 of the first left side wall 201, the second side edge 2022 of the first right side wall 202, the fourth side edge 1014 of the first upper side wall 101, and the fixing member 3. A sealing ring is formed on one side of the first front side wall 203, and the fifth sealing part 25 is magnetically attracted to the first front side wall 203, so that side edges of the first front side wall 203 fit against the second side edge 2012 of the first left side wall 201, the second side edge 2022 of the first right side wall 202, the fourth side edge 1014 of the first upper side wall 101, and the fixing member 3, thereby enabling the first storage space 12 to form a sealed space.

In this embodiment, the sealing structure 2 may be made of materials such as EVA (ethylene-vinyl acetate copolymer), silicone, and rubber.

In this embodiment, a storage member 4 is further provided inside the cabinet body 1, and the storage member 4 is disposed in the first storage space 12. The storage member 4 is detachably connected to the first left side wall 201 and the first right side wall 202 respectively. The storage member 4 is used for receiving items. The storage member 4 includes a plurality of support rods 41. The plurality of support rods 41 are arranged in sequence. An inner wall of the first left side wall 201 is provided with a first fixing frame 2015, and an inner wall of the first right side wall 202 is provided with a second fixing frame 2025. One side of each of the plurality of support rods 41 is detachably connected to the first fixing frame 2015, and an opposite side of each of the plurality of support rods 41 is detachably connected to the second fixing frame 2025. The storage member 4 is a storage plate 42. The storage plate 42 is disposed on the first fixing frame 2015 and the second fixing frame 2025, and the storage plate 42 is detachably connected to the first fixing frame 2015 and the second fixing frame 2025 respectively. Items can be placed in the first storage space 12 by means of the support rods 41, and can be arranged in sequence on the plurality of support rods 41. The items can also be sleeved onto the support rods 41, and different placement methods can be selected according to different items.

In this embodiment, one side of the first front side wall 203 is detachably connected to the first right side wall 202 through a plurality of hinge members 5. The plurality of hinge members 5 are arranged in sequence. One side of each of the plurality of hinge members 5 is detachably connected to the first front side wall 203, and an opposite side of each of the plurality of hinge members 5 is detachably connected to the first right side wall 202. The first front side wall 203 and the first right side wall 202 are connected by the hinge members 5, so that the first front side wall 203 serves as a door to open or close the first storage space 12. A display structure 6 is provided on the first front side wall 203. One side of the display structure 6 is disposed on an inner wall of the first front side wall 203, and an opposite side of the display structure 6 passes through the first front side wall 203 and is disposed outside the first front side wall 203. The display structure 6 includes a display screen 61 and a control board 62. A plurality of buttons 2031 are provided on one side of the first front side wall 203 where the display screen 61 is positioned. Both the display screen 61 and the plurality of buttons 2031 are electrically connected to the control board 62. The control board 62 receives information from a dehumidifier 9 and displays a working status of the dehumidifier 9 on the display screen 61 for a user to check. The display screen 61 also shows the humidity inside the first storage space 12. The temperature and humidity of the first storage space 12 are adjusted via the button 2031, and the control board 62 controls the dehumidifier 9 to work. A first handle 2032 is arranged on an outer wall of the first front side wall 203. The first handle 2032 facilitates the user to pull the first front side wall 203 to open or close the first storage space 12.

In this embodiment, the cabinet body 1 further includes a dehumidifier 9. The dehumidifier 9 is used for dehumidifying the first storage space 12, keeping humidity in the first storage space 12 within a controllable range. One side of the dehumidifier 9 is disposed in the first storage space 12 and electrically connected to the control board 62. An opposite side of the dehumidifier 9 passes through the first storage space 12, is disposed outside the first storage space 12, and is connected to an external power supply. The dehumidifier 9 dehumidifies the first storage space 12, regulating the humidity and temperature inside the first storage space 12 to ensure that the items stored in the first storage space 12 are maintained in an optimal preservation state.

In this embodiment, the cabinet body 1 further includes a first storage structure 300. The first storage structure 300 is connected to the first main body 11. The first storage structure 300 is provided with a second storage space 400. A plurality of second side walls 500 are connected to surround and form the second storage space 400. The plurality of second side walls 500 are detachably connected to each other. The plurality of second side walls 500 include a second upper side wall 501 and a second connecting side wall 600 connected to the second upper side wall 501. The second upper side wall 501 is detachably connected to an upper side of the second connecting side wall 600. The second connecting side wall 600 includes a second left side wall 601, a second right side wall 602, and a second rear side wall 603. The second upper side wall 501, the second left side wall 601, the second right side wall 602, the second rear side wall 603, and the first upper side wall 101 surround to form the second storage space 400. The second left side wall 601 can be a separate side wall or be integrally connected with the first left side wall 201. The second right side wall 602 can be a separate side wall or be integrally connected with the first right side wall 202. The second rear side wall 603 can be a separate side wall or be integrally connected with the first rear side wall 204.

In this embodiment, the first storage structure 300 further includes a drawer 301. The drawer 301 is disposed in the second storage space 400. A plurality of third side walls 302 are connected to surround and form the drawer 301. The plurality of third side walls 302 are foldable. The plurality of third side walls 302 are third non-woven fabric side walls. The drawer 301 is capable of holding some items. The foldable non-woven fabric drawer 301 is not only aesthetically pleasing in use but also lightweight and easy to slide in and out. The drawer 301 is equipped with a second handle 303. The second handle 303 is used for putting the drawer 301 into the second storage space 400 or pulling the drawer 301 out of the second storage space 400.

In this embodiment, the cabinet body 1 further includes a second storage structure 700. The second storage structure 700 is disposed above the cabinet body 1. The second storage structure 700 is provided with a third storage space 701. A plurality of fourth side walls 800 are connected to surround and form the third storage space 701. The plurality of fourth side walls 800 are detachably connected to each other. The plurality of fourth side walls 800 include a third upper side wall 801, a second lower side wall 802, and a third connecting side wall 900. The third connecting side wall 900 is connected to the third upper side wall 801 and the second lower side wall 802. The third upper side wall 801 is detachably connected to an upper side of the third connecting side wall 900. The second lower side wall 802 is detachably connected to a lower side of the third connecting side wall 900. The third upper side wall 801, the second lower side wall 802, and the third connecting side wall 900 surround to form the third storage space 701. The plurality of fourth side walls 800 are detachably connected and surround to form the third storage space 701. The plurality of fourth side walls 800 are connected by screws.

In this embodiment, the third connecting side wall 900 includes a third left side wall 901, a third right side wall 902, and a third rear side wall 903. A first side edge 8011 of the third upper side wall 801 is detachably connected to an upper side of the third left side wall 901. A second side edge 8012 of the third upper side wall 801 is detachably connected to an upper side of the third right side wall 902. The third side edge 8013 of the third upper side wall 801 is detachably connected to an upper side of the third rear side wall 903. A first side edge 8021 of the second lower side wall 802 is detachably connected to a lower side of the third left side wall 901. A second side edge 8022 of the second lower side wall 802 is detachably connected to a lower side of the third right side wall 902. A third side edge 8023 of the second lower side wall 802 is detachably connected to a lower side of the third rear side wall 903. The third left side wall 901 is provided with a first light-transmitting plate 9011 and a second light-transmitting plate 9012 in sequence. The third right side wall 902 is provided with a third light-transmitting plate 9021 and a fourth light-transmitting plate 9022 in sequence. The first light-transmitting plate 9011 corresponds to the third light-transmitting plate 9021 in position. The second light-transmitting plate 9012 corresponds to the fourth light-transmitting plate 9022 in position. Through the first light-transmitting plate 9011, the second light-transmitting plate 9012, the third light-transmitting plate 9021, and the fourth light-transmitting plate 9022, the user can clearly see the items placed in the third storage space 701 and the working status of the items.

In this embodiment, the second storage structure 700 further includes a first insertion member 702 and a second insertion member 703. The first insertion member 702 and the second insertion member 703 are both disposed above the cabinet body 1 and correspond to each other in position. The first insertion member 702 includes a first connecting rod 7021. Two ends of the first connecting rod 7021 are respectively provided with a first insertion portion 7022 and a second insertion portion 7023. The second insertion member 703 includes a second connecting rod 7031. Two ends of the second connecting rod 7031 are respectively provided with a third insertion portion 7032 and a fourth insertion portion 7033. A bottom portion of the third left side wall 901 is inserted into the first insertion portion 7022 and the third insertion portion 7032 respectively. A bottom portion of the third right side wall 902 is inserted into the second insertion portion 7023 and the fourth insertion portion 7033 respectively.

In this embodiment, the third connecting side wall 900 further includes a second front side wall 904 and a third front side wall 905. The second front side wall 904 and the third front side wall 905 are symmetrically positioned. An upper side of the second front side wall 904 is hinged to the third upper side wall 801. A lower side of the second front side wall 904 is hinged to the first connecting rod 7021. An upper side of the third front side wall 905 is hinged to the third upper side wall 801. A lower side of the third front side wall 905 is hinged to the first connecting rod 7021. The second storage structure 700 further includes a partition plate 7. The partition plate 7 is disposed within the third storage space 701 and divides the third storage space 701 into a fourth storage space 704 and a fifth storage space 705. A first side edge 71 of the partition plate 7 is detachably connected to the third left side wall 901. A second side edge 72 of the partition plate 7 is detachably connected to the third right side wall 902. A third side edge 73 of the partition plate 7 is detachably connected to the third rear side wall 903. A fourth side edge 74 of the partition plate 7 is provided with a magnetic attraction structure 75. The magnetic attraction structure 75 includes a first magnetic attraction member 751 and a second magnetic attraction member 752. The first magnetic attraction member 751 and the second magnetic attraction member 752 are arranged opposite to each other. The second front side wall 904 is provided with a third magnetic attraction member 9041 at a position corresponding to the first magnetic attraction member 751. The third magnetic attraction member 9041 is attracted to the first magnetic attraction member 751. The third front side wall 905 is provided with a fourth magnetic attraction member 9051 at a position corresponding to the second magnetic attraction member 752. The fourth magnetic attraction member 9051 is attracted to the second magnetic attraction member 752. The third magnetic attraction member 9041 and the fourth magnetic attraction member 9051 are arranged opposite to each other. The partition plate 7 divides the third storage space 701 into the fourth storage space 704 and the fifth storage space 705. The fourth storage space 704 and the fifth storage space 705 can hold different items, allowing the third storage space 701 to hold more things. The third magnetic attraction member 9041 is attracted to the first magnetic attraction member 751, and the fourth magnetic attraction member 9051 is attracted to the second magnetic attraction member 752, so that the second front side wall 904 and the third front side wall 905 abut against the partition plate 7, and the third storage space 701 is opened or closed through the second front side wall 904 and the third front side wall 905.

In this embodiment, the cabinet body 1 further includes a second storage structure 700 and a lighting device 8. The lighting device 8 is magnetically arranged within the second storage structure 700. The lighting device 8 includes a first lighting structure 81 and a second lighting structure 82. Both the first lighting structure 81 and the second lighting structure 82 are magnetically attached within the third storage space 701. The first lighting structure 81 is magnetically attached to a bottom portion of the third upper side wall 801 to illuminate the fourth storage space 704. The second lighting structure 82 is magnetically attached to a bottom portion of the partition plate 7 to illuminate the fifth storage space 705.

In this embodiment, the second storage structure 700 further includes an air extraction device 706 and a power connector 707. One side of the air extraction device 706 is disposed in the third storage space 701, and an opposite side of the air extraction device 706 passes through the third storage space 701 and is disposed outside the second storage structure 700. One side of the power connector 707 is disposed in the third storage space 701, and an opposite side of the power connector 707 is connected to an external power supply through a connection cable. When the items in the third storage space 701 produce gas during operation, the gas in the third storage space 701 is extracted by the air extraction device 706 to keep the air in the third storage space 701 clean. The power connector 707 is connected to an external power source and is connected to the items in the third storage space 701, providing power to the items in the third storage space 701.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A detachable and sealed dehumidification cabinet, comprising:
   a cabinet body, wherein the cabinet body is provided with a first main body, the first main body is provided with a first storage space, and a plurality of first side walls are connected to surround and form the first storage space; and
   a sealing structure, wherein the sealing structure is arranged at joints between the plurality of first side walls, and the sealing structure is configured for sealing the joints between the plurality of first side walls to form the sealed first storage space;
   wherein the plurality of first side walls are detachably connected to each other; the plurality of first side walls comprise a first upper side wall, a first lower side wall, and a first connecting side wall; the first connecting side wall is connected to the first upper side wall and the first lower side wall; the first upper side wall is detachably connected to an upper side of the first connecting side wall; the first lower side wall is detachably connected to a lower side of the first connecting side wall; and the first upper side wall, the first lower side wall, and the first connecting side wall surround to form the first storage space;
   wherein the sealing structure comprises a first sealing part and a second sealing part; the first sealing part is configured for sealing a joint between the first upper side wall and the first connecting side wall; and the second sealing part is configured for sealing a joint between the first lower side wall and the first connecting side wall;
   wherein the first upper side wall is detachably connected to a top portion of the first connecting side wall; the first lower side wall is detachably connected to a bottom portion of the first connecting side wall; the first connecting side wall comprises a first left side wall, a first right side wall, a first front side wall, and a first rear side wall; the first sealing part comprises a first sealing strip, a second sealing strip, and a third sealing strip; the first sealing strip is disposed between the first upper side wall and the first left side wall; the first sealing strip is configured for sealing a joint between the first upper side wall and the first left side wall; the second sealing strip is disposed between the first upper side wall and the first right side wall; the second sealing strip is configured for sealing a joint between the first upper side wall and the first right side wall; the third sealing strip is disposed between the first upper side wall and the first rear side wall; and the third sealing strip is configured for sealing a joint between the first upper side wall and the first rear side wall;

wherein the second sealing part comprises a fourth sealing strip, a fifth sealing strip, and a sixth sealing strip; the fourth sealing strip is disposed between the first lower side wall and the first left side wall; the fourth sealing strip is configured for sealing a joint between the first lower side wall and the first left side wall; the fifth sealing strip is disposed between the first lower side wall and the first right side wall; the fifth sealing strip is configured for sealing a joint between the first lower side wall and the first right side wall; the sixth sealing strip is disposed between the first lower side wall and the first rear side wall; and the sixth sealing strip is configured for sealing a joint between the first lower side wall and the first rear side wall;

wherein the sealing structure further comprises a third sealing part; the third sealing part is configured for sealing joints between the first rear side wall and both the first left side wall and the first right side wall; the third sealing part comprises a seventh sealing strip and an eighth sealing strip; the seventh sealing strip is disposed between the first rear side wall and the first left side wall; the seventh sealing strip is configured for sealing a joint between the first rear side wall and the first left side wall; the eighth sealing strip is disposed between the first rear side wall and the first right side wall; and the eighth sealing strip is configured for sealing a joint between the first rear side wall and the first right side wall.

2. The detachable and sealed dehumidification cabinet according to claim 1, wherein the cabinet body further comprises a fixing member; the fixing member is disposed on the first lower side wall, and is detachably connected to the first left side wall and the first right side wall respectively; the sealing structure comprises a fourth sealing part; the fourth sealing part is configured for sealing a joint between the fixing member and the first left side wall, and a joint between the fixing member and the first right side wall; the fourth sealing part comprises a ninth sealing strip and a tenth sealing strip; the ninth sealing strip is disposed between the fixing member and the first left side wall; the ninth sealing strip is configured for sealing the joint between the fixing member and the first left side wall; the tenth sealing strip is disposed between the fixing member and the first right side wall; and the tenth sealing strip is configured for sealing the joint between the fixing member and the first right side wall.

3. The detachable and sealed dehumidification cabinet according to claim 2, wherein the sealing structure comprises a fifth sealing part; the fifth sealing part is magnetically attracted to the first front side wall; the fifth sealing part is detachably connected to the first left side wall, the first right side wall, the first upper side wall, and the fixing member respectively; the fifth sealing part comprises an eleventh sealing strip, a twelfth sealing strip, a thirteenth sealing strip, and a fourteenth sealing strip; the eleventh sealing strip is disposed on the first left side wall and is detachably connected to the first left side wall; the twelfth sealing strip is disposed on the first right side wall and is detachably connected to the first right side wall; the thirteenth sealing strip is disposed on the first upper side wall and is detachably connected to the first upper side wall; and the fourteenth sealing strip is disposed on the fixing member and is detachably connected to the fixing member.

4. The detachable and sealed dehumidification cabinet according to claim 1, wherein the sealing structure may be made of materials selected from a group consisting of EVA, silicone, and rubber.

5. A detachable and sealed dehumidification cabinet, comprising:

a cabinet body, wherein the cabinet body is provided with a first main body, the first main body is provided with a first storage space, and a plurality of first side walls are connected to surround and form the first storage space; and a sealing structure, wherein the sealing structure is arranged at joints between the plurality of first side walls, and the sealing structure is configured for sealing the joints between the plurality of first side walls to form the sealed first storage space;

wherein the plurality of first side walls are detachably connected to each other; the plurality of first side walls comprise a first upper side wall, a first lower side wall, and a first connecting side wall; the first connecting side wall is connected to the first upper side wall and the first lower side wall; the first upper side wall is detachably connected to an upper side of the first connecting side wall; the first lower side wall is detachably connected to a lower side of the first connecting side wall; and the first upper side wall, the first lower side wall, and the first connecting side wall surround to form the first storage space;

wherein the sealing structure comprises a first sealing part and a second sealing part; the first sealing part is configured for sealing a joint between the first upper side wall and the first connecting side wall; and the second sealing part is configured for sealing a joint between the first lower side wall and the first connecting side wall;

wherein the first upper side wall is detachably connected to a top portion of the first connecting side wall; the first lower side wall is detachably connected to a bottom portion of the first connecting side wall; the first connecting side wall comprises a first left side wall, a first right side wall, a first front side wall, and a first rear side wall; the first sealing part comprises a first sealing strip, a second sealing strip, and a third sealing strip; the first sealing strip is disposed between the first upper side wall and the first left side wall; the first sealing strip is configured for sealing a joint between the first upper side wall and the first left side wall; the second sealing strip is disposed between the first upper side wall and the first right side wall; the second sealing strip is configured for sealing a joint between the first upper side wall and the first right side wall; the third sealing strip is disposed between the first upper side wall and the first rear side wall; and the third sealing strip is configured for sealing a joint between the first upper side wall and the first rear side wall;

wherein a storage member is further provided inside the cabinet body; the storage member is disposed in the first storage space; the storage member is detachably connected to the first left side wall and the first right side wall respectively; the storage member is configured for receiving items; the storage member comprises a plurality of support rods; the plurality of support rods are arranged in sequence; an inner wall of the first left side wall is provided with a first fixing frame; an inner wall of the first right side wall is provided with a second fixing frame; one side of each of the plurality of support rods is detachably connected to the first fixing frame; an opposite side of each of the plurality of support rods is detachably connected to the second fixing frame; the storage member is a storage plate; the storage plate is disposed on the first fixing frame and the second fixing frame; and the storage plate is detachably connected to the first fixing frame and the second fixing frame respectively.

6. The detachable and sealed dehumidification cabinet according to claim 5, wherein one side of the first front side wall is detachably connected to the first right side wall through a plurality of hinge members; the plurality of hinge members are arranged in sequence; one side of each of the plurality of hinge members is detachably connected to the first front side wall; an opposite side of each of the plurality of hinge members is detachably connected to the first right side wall; a display structure is provided on the first front side wall; one side of the display structure is disposed on an inner wall of the first front side wall; an opposite side of the display structure passes through the first front side wall and is disposed outside the first front side wall; the display structure comprises a display screen and a control board; a plurality of buttons are provided on one side of the first front side wall where the display screen is positioned; both the display screen and the plurality of buttons are electrically connected to the control board; and a first handle is arranged on an outer wall of the first front side wall.

7. The detachable and sealed dehumidification cabinet according to claim 5, wherein the cabinet body further comprises a first storage structure; the first storage structure is connected to the first main body; the first storage structure is provided with a second storage space; a plurality of second side walls are connected to surround and form the second storage space; the plurality of second side walls are detachably connected to each other; the plurality of second side walls comprise a second upper side wall and a second connecting side wall connected to the second upper side wall; the second upper side wall is detachably connected to an upper side of the second connecting side wall; the second connecting side wall comprises a second left side wall, a second right side wall, and a second rear side wall; and the second upper side wall, the second left side wall, the second right side wall, the second rear side wall, and the first upper side wall surround to form the second storage space.

8. The detachable and sealed dehumidification cabinet according to claim 7, wherein the first storage structure further comprises a drawer; the drawer is disposed in the second storage space; a plurality of third side walls are connected to surround and form the drawer; the plurality of third side walls are foldable; the plurality of third side walls are third non-woven fabric side walls; the drawer is equipped with a second handle; and the second handle is configured for putting the drawer into the second storage space or pulling the drawer out of the second storage space.

* * * * *